US011605854B2

(12) United States Patent
Zafiropoulos et al.

(10) Patent No.: US 11,605,854 B2
(45) Date of Patent: Mar. 14, 2023

(54) CARBON AEROGEL-BASED CATHODES FOR LITHIUM-AIR BATTERIES

(71) Applicant: Aspen Aerogels, Inc., Northborough, MA (US)

(72) Inventors: Nicholas A. Zafiropoulos, Wayland, MA (US); George L. Gould, Mendon, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 38 days.

(21) Appl. No.: 16/826,223

(22) Filed: Mar. 21, 2020

(65) Prior Publication Data

US 2020/0303793 A1    Sep. 24, 2020

Related U.S. Application Data

(60) Provisional application No. 62/822,710, filed on Mar. 22, 2019.

(51) Int. Cl.
| | |
|---|---|
| *H01M 12/06* | (2006.01) |
| *H01M 4/583* | (2010.01) |
| *H01M 4/42* | (2006.01) |
| *H01M 4/66* | (2006.01) |
| *H01M 4/96* | (2006.01) |

(Continued)

(52) U.S. Cl.
CPC ............. *H01M 12/06* (2013.01); *C01B 32/15* (2017.08); *H01M 4/382* (2013.01); *H01M 4/42* (2013.01);

(Continued)

(58) Field of Classification Search
None
See application file for complete search history.

(56) References Cited

U.S. PATENT DOCUMENTS

| | | | | |
|---|---|---|---|---|
| 3,612,819 A | * | 10/1971 | Gibson | ................... D01F 11/16 |
| | | | | 423/447.7 |
| 4,474,662 A | | 10/1984 | Makino et al. | |

(Continued)

FOREIGN PATENT DOCUMENTS

| | | |
|---|---|---|
| CN | 102277648 | 12/2011 |
| CN | 104241734 | 12/2014 |

(Continued)

OTHER PUBLICATIONS

Machine Translation of DE-102015207552-A1 from Espacenet originally published on Oct. 2016 to Godbole (Year: 2016).*

(Continued)

*Primary Examiner* — Ula C Ruddock
*Assistant Examiner* — Mary Grace Byram
(74) *Attorney, Agent, or Firm* — Paul A. Smith; Christopher Stow

(57) ABSTRACT

Nanoporous carbon-based scaffolds or structures, and specifically carbon aerogels and their manufacture and use thereof. Embodiments include a cathode material within a lithium-air battery, where the cathode is formed of a binder-free, monolithic, polyimide-derived carbon aerogel. The carbon aerogel includes pores that improve the oxygen transport properties of electrolyte solution and improve the formation of lithium peroxide along the surface and/or within the pores of the carbon aerogel. The cathode and underlying carbon aerogel provide optimal properties for use within the lithium-air battery.

17 Claims, 2 Drawing Sheets

(51) Int. Cl.
  *H01M 12/08* (2006.01)
  *C01B 32/15* (2017.01)
  *H01M 4/38* (2006.01)
  *H01M 4/86* (2006.01)

(52) U.S. Cl.
  CPC ........... *H01M 4/583* (2013.01); *H01M 4/663* (2013.01); *H01M 4/8647* (2013.01); *H01M 4/96* (2013.01); *H01M 12/08* (2013.01); *H01M 12/085* (2013.01); *H01M 2004/8689* (2013.01)

(56) References Cited

U.S. PATENT DOCUMENTS

| | | | |
|---|---|---|---|
| 4,606,955 A | 8/1986 | Eastman et al. | |
| 4,610,863 A | 9/1986 | Tewari et al. | |
| 4,898,753 A | 2/1990 | Inoue et al. | |
| 4,997,804 A | 3/1991 | Pekala | |
| 5,231,162 A | 7/1993 | Nagata | |
| 5,234,966 A | 8/1993 | Barringer et al. | |
| 5,260,855 A | 11/1993 | Kaschmitter et al. | |
| 5,275,796 A | 1/1994 | Tillotson et al. | |
| 5,284,519 A | 2/1994 | Gadgil | |
| 5,358,802 A | 10/1994 | Mayer et al. | |
| 5,366,828 A * | 11/1994 | Struthers | H01M 4/806 29/623.5 |
| 5,376,209 A | 12/1994 | Stoakley et al. | |
| 5,395,805 A | 3/1995 | Droege et al. | |
| 5,420,168 A | 5/1995 | Mayer et al. | |
| 5,476,878 A | 12/1995 | Pekala | |
| 5,502,156 A | 3/1996 | St. Clair et al. | |
| 5,520,960 A | 5/1996 | Rancourt et al. | |
| 5,565,142 A | 10/1996 | Deshpande et al. | |
| 5,575,955 A | 11/1996 | Caplan et al. | |
| 5,601,938 A | 2/1997 | Mayer et al. | |
| 5,626,977 A | 5/1997 | Mayer et al. | |
| 5,677,418 A | 10/1997 | Thompson et al. | |
| 5,859,171 A | 1/1999 | Sawasaki et al. | |
| 5,908,896 A | 6/1999 | Mayer et al. | |
| 5,962,539 A | 10/1999 | Perrut et al. | |
| 6,194,099 B1 | 2/2001 | Gemov et al. | |
| 6,315,971 B1 | 11/2001 | Wallace et al. | |
| 6,332,990 B1 | 12/2001 | Mayer et al. | |
| 6,399,669 B1 | 6/2002 | Suzuki et al. | |
| 6,451,965 B1 | 9/2002 | Kanada et al. | |
| 6,544,648 B1 | 4/2003 | Nesbitt et al. | |
| 6,586,081 B1 | 7/2003 | Nishinaka et al. | |
| 6,670,402 B1 | 12/2003 | Lee et al. | |
| 6,726,962 B1 | 4/2004 | Loszewski | |
| 7,071,287 B2 | 7/2006 | Rhine et al. | |
| 7,074,880 B2 | 7/2006 | Rhine et al. | |
| 7,811,711 B2 | 10/2010 | Cooper et al. | |
| 8,404,278 B2 | 3/2013 | Albrecht et al. | |
| 8,414,805 B2 | 4/2013 | Wang | |
| 8,999,202 B2 | 4/2015 | Mulik et al. | |
| 9,178,208 B2 | 11/2015 | Park et al. | |
| 9,745,198 B2 | 8/2017 | Leventis et al. | |
| 9,871,248 B2 | 1/2018 | Rayner et al. | |
| 2004/0132845 A1 | 7/2004 | Rhine et al. | |
| 2006/0029857 A1* | 2/2006 | Cherepy | H01M 12/08 429/128 |
| 2006/0084707 A1 | 4/2006 | Ou et al. | |
| 2009/0053594 A1 | 2/2009 | Johnson et al. | |
| 2009/0136809 A1* | 5/2009 | Wang | B82Y 30/00 429/129 |
| 2010/0310847 A1 | 12/2010 | Suh et al. | |
| 2011/0223494 A1* | 9/2011 | Feaver | H01M 4/463 429/405 |
| 2012/0134909 A1* | 5/2012 | Leventis | C01B 32/90 521/157 |
| 2012/0141889 A1* | 6/2012 | Lee | H01M 12/06 429/405 |
| 2012/0152846 A1* | 6/2012 | Leventis | C08G 18/302 977/788 |
| 2012/0202112 A1 | 8/2012 | Yushin et al. | |
| 2013/0040229 A1* | 2/2013 | Grigorian | C07C 233/00 429/532 |
| 2013/0220974 A1 | 8/2013 | Yushin | |
| 2013/0224594 A1 | 8/2013 | Yushin et al. | |
| 2013/0344391 A1 | 12/2013 | Yushin et al. | |
| 2014/0170503 A1 | 6/2014 | Yushin et al. | |
| 2014/0272592 A1 | 9/2014 | Thompkins et al. | |
| 2014/0287641 A1* | 9/2014 | Steiner, III | F41H 5/0442 442/223 |
| 2014/0315100 A1 | 10/2014 | Wang et al. | |
| 2015/0064568 A1 | 3/2015 | Yushin et al. | |
| 2015/0236372 A1 | 8/2015 | Yushin et al. | |
| 2015/0283534 A1 | 10/2015 | Costantino et al. | |
| 2015/0325882 A1 | 11/2015 | Yushin et al. | |
| 2015/0349346 A1 | 12/2015 | Yushin et al. | |
| 2016/0104882 A1 | 4/2016 | Yushin et al. | |
| 2016/0133394 A1 | 5/2016 | Sakshaug et al. | |
| 2016/0149278 A1 | 5/2016 | Woehrle et al. | |
| 2016/0240840 A1 | 8/2016 | He et al. | |
| 2016/0244332 A1* | 8/2016 | Zhao | C01B 32/05 |
| 2016/0344030 A1 | 11/2016 | Sakshaug et al. | |
| 2017/0015559 A1 | 1/2017 | Costantino et al. | |
| 2017/0062219 A1 | 3/2017 | Li et al. | |
| 2017/0098823 A1 | 4/2017 | Yushin et al. | |
| 2017/0121483 A1 | 5/2017 | Poe et al. | |
| 2017/0170477 A1 | 6/2017 | Sakshaug et al. | |
| 2017/0170515 A1 | 6/2017 | Yushin et al. | |
| 2017/0233579 A1 | 8/2017 | Yushin et al. | |
| 2017/0355829 A1 | 12/2017 | Sakaguchi et al. | |
| 2018/0043656 A1 | 2/2018 | Song et al. | |
| 2018/0067262 A1 | 3/2018 | Larson et al. | |
| 2018/0145328 A1 | 5/2018 | Mullins et al. | |
| 2018/0151884 A1 | 5/2018 | Yushin et al. | |
| 2018/0205111 A1 | 7/2018 | Yushin et al. | |
| 2018/0331356 A1 | 11/2018 | Feaver et al. | |
| 2018/0346337 A1 | 12/2018 | Tour et al. | |
| 2019/0006672 A1 | 1/2019 | Yushin et al. | |
| 2019/0040497 A1 | 2/2019 | Yushin et al. | |
| 2019/0051892 A1 | 2/2019 | Yushin et al. | |
| 2019/0062517 A1* | 2/2019 | Steiner, III | C08J 9/28 |
| 2019/0081359 A1 | 3/2019 | Yushin et al. | |
| 2019/0081360 A1 | 3/2019 | Yushin et al. | |
| 2019/0123339 A1 | 4/2019 | Yushin et al. | |
| 2019/0148803 A1* | 5/2019 | Lee | H01M 4/9016 429/405 |
| 2019/0157682 A1 | 5/2019 | Ho et al. | |
| 2019/0198837 A1 | 6/2019 | Yushin et al. | |
| 2019/0259546 A1 | 8/2019 | Benjamin et al. | |
| 2019/0326589 A1 | 10/2019 | Ho et al. | |
| 2020/0024796 A1 | 1/2020 | Yushin et al. | |
| 2020/0083542 A1 | 3/2020 | Yushin et al. | |
| 2020/0091517 A1 | 3/2020 | Yushin et al. | |
| 2020/0235420 A1 | 7/2020 | Yushin et al. | |

FOREIGN PATENT DOCUMENTS

| | | | |
|---|---|---|---|
| CN | 106207142 | 12/2016 | |
| DE | 102015207552 | 10/2016 | |
| DE | 102015207552 A1 * | 10/2016 | .......... H01M 4/8668 |
| EP | 0987294 | 3/2000 | |
| EP | 1205512 | 5/2002 | |
| WO | WO2004009673 | 1/2004 | |
| WO | WO2016127084 | 8/2016 | |
| WO | 2018/095285 A1 | 5/2018 | |
| WO | WO2018095283 | 5/2018 | |
| WO | WO2018200827 | 11/2018 | |

OTHER PUBLICATIONS

Zuo, L.; Zhang, Y.; Zhang, L.; Miao, Y.-E.; Fan, W.; Liu, T. Polymer/Carbon-Based Hybrid Aerogels: Preparation, Properties and Applications. Oct. 9, 2015. Materials 2015, 8, 6806-6848. (Year: 2015).*

Alexander E. Gash, et al., "New Sol-gel Synthetic Route to Transition and Main-group Metal Oxide Aerogels Using Inorganic Salt Precursors", Journal of Non-Crystalline Solids, 285 (2001), 22.

(56) References Cited

OTHER PUBLICATIONS

Chidambareswarapattar et al., One-step room-temperature synthesis of fibrous polyimide aerogels from anhydrides and isocyanates and conversion to isomorphic carbons, J. Mater. Chem., 2010, 20, 9666-9678.
Dai et al. "Metal-organic framework-templated synthesis of sulfur-doped core-sheath nanoarrays and nanoporous carbon for flexible all-solid-state asymmetric supercapacitors" Nanoscale. Jul. 24, 2018 vol. 10, p. 15454-15461.
E. Frackowiak and F. Beguin, "Carbon materials for the electrochemical storage of energy in capacitors," Carbon, 39 (2001) 937.
Elena Bekyarova and Katsumi Kaneko, "Structure and Physical Properties of Tailor-Made Ce, Zr-Doped Carbon Aerogels", Advanced Materials, 12, [21] (2000) 1625-1628.
F.J. Maldonado-Hodar, et al., "Synthesis and textural characteristics of organic aerogels, transition-metal-containing organic aerogels and their carbonized derivatives," Carbon, 37 (1999) 1199.
G. Biesmans, et al., "Polyurethane based organic aerogels and their transformation into carbon aerogels", Journal of Non-Crystalline Solids, 225, (1998) 64.
Guo et al., Polyimide Aerogels Cross-Linked through Amine Functionalized Polyoligomeric Silsesquioxane, ACS Appl. Mater. Interfaces 2011, 3, 546-552.
J. M. Miller and B. Dunn, "Morphology and electrochemistry of ruthenium/carbon aerogel nanostructures", Langmuir, 15 (1999) 799.
J. Wang, et al., "Carbon cloth reinforced carbon aerogel films derived from resorcinol formaldehyde", J. Porous Materials, 8 (2001) 159.
J. Wang, et al., "Electrical Transport Properties of Carbon Aerogels ", J. of Porous Materials, 8 (2001) 167.
Kistler, "Coherent Expanded Aerogels," J. Phys Chem. 1932, 36(1), pp. 52-64.
Leventis et al., Isocyanate-Derived Organic Aerogels: Polyureas, Polyimides, Polyamides, MRS Proceedings, 1306 (2011).
Leventis et al., Polyimide Aerogels by Ring-Opening Metathesis Polymerization (ROMP), Chem. Mater. 2011, 23, 8, 2250-2261.
Li Xifei, Yang Jinli, Hu Yuhai, Wang Jiajun, Li Yongliang, Cai Mei, Li Ruying, Sun Xueliang: "Novel approach toward a binder-free and current collector-free anode configuration: highly flexible nanoporous carbon nanotube electrodes with strong mechanical strength harvesting improved lithium storage", J. Mater. Chem., vol. 22, No. 36, Jul. 2012 (Jul. 1, 2012), pp. 18447-18553.
Lizeng Zuo et al: "Polymer/Carbon-Based Hybrid Aerogels: Preparation, Properties and Applications", Materials, vol. 8, No. 10, Oct. 9, 2015 (Oct. 9, 2015), pp. 6806-6848.
M. Glora, et al., "Integration of Carbon Aerogels in PEM Fuel Cells," J. Mon-Cryst. Solids, 285 (2001) 283-287.
Meador et al., Polyimide Aerogels with Amide Cross-Links: A Low Cost Alternative for Mechanically Strong Polymer Aerogels, ACS Appl. Mater. Interfaces 2015, 7, 1240-1249.
Nguyen et al., Development of High Temperature, Flexible Polyimide Aerogels, American Chemical Society, proceedings published 2011.
Pei et al., Preparation and Characterization of Highly Cross-Linked Polyimide Aerogels Based on Polyimide Containing Trimethoxysilane Side Groups, Langmuir 2014, 30, 13375-13383 2014.
R. Petricevic, et al., "Planar fiber reinforced carbon aerogels for applications in PEM fuel cells", Carbon, 39 (2001) 857-867.
R. Saliger, et al., "High surface area carbon aerogels for supercapacitors", Journal of Non-Crystalline Solids, 225 (1998) 81.
R. W. Pekala, et al., "Carbon Aerogels for Electrochemical Applications", Journal of Non-Crystalline Solids, 225 (1998), 74.
Singh et al. "Sulfur-Doped Laser-Induced Porous Graphene Derived from Polysulfone-Class Polymers and Membranes" ACS Nano. Dec. 14, 2017 vol. 12, p. 289-297.
V. Bock, et al., "Influence of Monomer and Catalyst Concentration on RF and Carbon Aerogel Structure", Journal of Non-Crystalline Solids, 225 (1998), 69.
Wang et al.: "A dual pore carbon aerogel based air cathode for a highly rechargeable lithium-air battery", J. Power Sources, vol. 272, Sep. 11, 2014 (Sep. 11, 2014), pp. 1061-1071.
Wang G X et al: "Nanostructured Si-C composite anodes for lithium-ion batteries", Electrochemistry Communications, Elsevier, Amsterdam, NL, vol. 6, No. 7, Jun. 2, 2004 (Jun. 2, 2004), pp. 689-692.
Y. Hanzawa, et al., "Activated carbon aerogels", Langmuir, 12, [26], (1996) 6167.
Zhang et al., Graphene/carbon aerogels derived from graphene crosslinked polyimide as electrode materials for supercapacitors, RSC Adv., 2015, 5, 1301.
International Search Report and Written Opinion of the International Searching Authority in PCT/US2020/020148, dated Sep. 3, 2020.
International Search Report and Written Opinion of the International Searching Authority in PCT/US2020/024086, dated Oct. 1, 2020.
International Search Report and Written Opinion of the International Searching Authority in PCT/US2020/024113, dated Oct. 1, 2020.
Nitze et al., "A binder-free sulfur/reduced graphene oxide aerogel as high performance electrode materials for lithium sulfur batteries", Scientific Reports, vol. 6, 2016.
Wang et al., "Preparation and performances of carbon aerogel microspheres for the application of supercapacitor", Journal of Solid State Electrochemistry, vol. 15, 2011, pp. 643-648.
Via et al., "Tensile modulus modeling of carbon black/polycarbonate, carbon nanotube/polycarbonate, and exfoliated graphite nanoplatelet/polycarbonate composites", Journal of Applied Polymer Science, 2011.
Worsley et al.,"Mechanically Robust and Electrically Conductive Carbon Nanotube Foams", Appl. Phys. Lett. 94, 073115 (2009).
Gorgolis et al., "Graphene aerogels: a review", 2D Materials, vol. 4, No. 3, 2017, pp. 1-21.

* cited by examiner

CARBON AEROGEL-BASED CATHODES FOR LITHIUM-AIR BATTERIES

CROSS REFERENCES TO RELATED APPLICATIONS

This application claims the benefit of priority from U.S. Provisional Patent Application No. 62/822,710 filed Mar. 22, 2019, which is hereby incorporated by reference in its entirety, with any definitions of terms in the present application controlling.

FIELD

This invention relates, generally, to nanoporous carbon-based materials. More specifically, it relates to carbon aerogels suitable for use in environments containing electrochemical reactions, for example as an electrode material within a lithium-air battery.

BACKGROUND

Aerogels are solid materials that include a highly porous network of micro-sized and meso-sized pores. Depending on precursor materials used and processing undertaken, the pores of an aerogel can frequently account for over 90% of the volume when the density of the aerogel about 0.05 g/cc. Aerogels are generally prepared by removing the solvent from a gel (a solid network that contains its solvent) in a manner that minimal or no contraction of the gel can be brought by capillary forces at its surface. Methods of solvent removal include, but are not limited to, supercritical drying (or drying using supercritical fluids, such that the low surface tension of the supercritical fluid exchanges with the transient solvent within the gel), exchange of solvent with supercritical fluid, exchange of solvent with fluid that subsequently transformed to supercritical state, sub- or near-critical drying, and sublimating a frozen solvent in a freeze-drying process, see for example, PCT Patent Application Publication No. WO2016127084A1. It should be noted that when drying in ambient conditions, gel contraction may take place with solvent evaporation, and a xerogel can form. Therefore, aerogel preparation through a sol-gel process or other polymerization processes typically proceeds in the following series of steps: dissolution of the solute in a solvent, formation of the sol/solution/mixture, formation of the gel (may involve additional cross-linking), and solvent removal by either supercritical drying technique or any other method that removes solvent from the gel without causing pore collapse.

Aerogels can be formed of inorganic materials and/or organic materials. When formed of organic materials—such as phenols, resorcinol-formaldehyde (RF), phloroglucinol furfuraldehyde (PF), poly acrylonitrile (PAN), polyimide (PI), polyurethane (PU), polybutadiene, polydicyclopentadiene, and precursors or polymeric derivatives thereof, for example—the aerogel may be carbonized (e.g., by pyrolysis) to form a carbon aerogel, which can have properties (e.g., pore volume, pore size distribution, morphology, etc.) that differ or overlap from each other, depending on the precursor materials and methodologies used. However, in all cases, there have been certain deficiencies based on material and application, for example low pore volume, wide pore size distribution, low mechanical strength, etc. Recently, there has been effort devoted to the development and characterization of carbon aerogels as electrode materials with improved performance for applications in energy storage devices, such as zinc-air/oxygen and lithium-air/oxygen batteries (collectively "Li-air batteries").

Li-air batteries have become an increasingly attractive form of electrochemical energy storage and an alternative to lithium-ion batteries (LIBs) because of their potential to achieve high reversible energy storage and high cycles at low cost. Li-air batteries are a type of rechargeable battery in which lithium ions travel from an anode to a cathode—via liquid or solid electrolyte—during discharge and from the cathode to the anode during charge. Conventionally, for a Li-air system, the anode is formed of lithium metal, and the active material of the cathode is not stored in the battery. Rather, the active material of the cathode is formed during discharge by the reduction of oxygen drawn in from the ambient air to form lithium peroxide ($Li_2O_2$). During charging, $Li_2O_2$ is oxidized to release oxygen and allow lithium ions to travel back to the anode. Porous carbonaceous materials are commonly used in Li-air batteries, as the carbon surface serves as the reaction site for $Li_2O_2$ formation during discharge. Li-air batteries can, in theory, achieve very high capacities (greater than 1,000 mAh/g) and energy densities (greater than 500 Wh/kg) because it is dependent on the capacity of the cathode to form $Li_2O_2$. In order to form $Li_2O_2$ on the surface of the porous carbonaceous material, which contains an electrolyte, it is important that the electrolyte has very good oxygen transport properties, meaning oxygen can diffuse into the electrolyte and then travel to the carbon surfaces.

Despite the opportunity to achieve high capacity and energy density with Li-air batteries, conventional Li-air batteries have not seen widespread commercial adoption like their LIB counterparts, which are characterized by higher cycle life but lower energy density. The common challenges and hurdles for Li-air batteries that need to be overcome in order for these to be a viable energy system include behavior under variable humidity, oxygen availability to the reaction site (carbon surface), electrolyte composition, and structure of the carbonaceous material itself. Water, for example, is a problematic species for Li-air batteries because if it reaches the anode, it can react violently with the lithium metal. Water can also react with $Li_2O_2$ in the cathode followed by reaction with carbon dioxide to form $Li_2CO_3$, which eventually leads to clogging of the cathode and performance loss. The formation of $Li_2O_2$ within the porous carbon alone can lead to clogging of electrode, making it increasingly difficult to re-dissolve $Li_2O_2$ during charging back into the electrolyte and oxygen release.

Accordingly, what is needed is an improved nanoporous carbon material that includes a functional morphology and optimal pore structure, where nano-$Li_2O_2$ is formed and available to re-dissolve back into the electrolyte that is consistent in size (e.g., narrow pore size distribution). However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein, especially in combination with the innovative aspects described herein.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

The long-standing but heretofore unfulfilled need for an improved nanoporous carbon material is now met by a new, useful, and nonobvious invention.

A first general aspect relates to a cathode, e.g., a nanoporous carbon cathode, in a lithium-air/oxygen or zinc-air/oxygen battery. The cathode includes a nanoporous carbon material that has a pore structure comprising a fibrillar morphology and an array of pores that surround lithium peroxide particles.

In exemplary embodiments, the cathode has a pore structure with a substantially uniform pore size distribution, where pores accommodate formation of lithium peroxide particles. In some embodiments, the cathode can have a density between about 0.10 g/cc and about 1.5 g/cc and either or both of a Young modulus of at least about 0.2 GPa and an electrical conductivity of at least about 1 S/cm.

In exemplary embodiments, the nanoporous carbon material includes a carbon aerogel. For example, the carbon material can include a polyimide-derived carbon aerogel. In some embodiments, the carbon aerogel can be in a monolith or a powder form. In some embodiments, the monolithic carbon aerogel can be substantially or completely binder-free. The monolithic carbon aerogel can have a thickness between about 10 µm and about 1000 µm.

In exemplary embodiments, the pore structure of the carbon material is characterized by pores surrounding the lithium peroxide particles. In some embodiments, the pores of the carbon material form interconnected structures around the lithium peroxide particles, characterized, for example, by a plurality of connection points between the lithium peroxide particles and pore walls of each pore in which the lithium peroxide particles are surrounded.

In exemplary embodiments, the nanoporous carbon material, e.g., of the cathode, includes about 5%-90% of the lithium peroxide particles by weight of the carbon material. In exemplary embodiments, the carbon material can have any of a pore volume of at least 0.3 cc/g, a porosity between about 10% and about 90%, and/or a capacity of at least about 800 mAh/g. In exemplary embodiments, the pore structure of the carbon material can include a full width at half max of about 50 nm or less, a pore size at max peak from distribution of about 100 nm or less, and/or an average strut width of about 2-10 nm.

Another general aspect relates to a monolithic polyimide-derived carbon aerogel composite formed of a nanoporous carbon material. In exemplary embodiments, the composite is free of binders and lithium peroxide particles are disposed along a surface or within pores of the monolithic polyimide-derived carbon aerogel composite, and the carbon aerogel composite forms a cathode in a lithium-air/oxygen or zinc-air/oxygen battery.

A further general aspect relates to a collector-less, binder-less, interconnected cathode material for a lithium-air/oxygen or zinc-air/oxygen battery. In exemplary embodiments, the cathode material includes an open-cell, monolithic, polyimide-derived nanoporous carbon aerogel having a fibrillar network and an array of pores. In some embodiments, lithium peroxide particles are disposed along a surface or within pores of the carbon aerogel.

Other general aspects relate to an electrochemical cell or a lithium-air/oxygen or zinc-air/oxygen battery including the nanoporous carbon material or carbon aerogel of any embodiments disclosed herein. For example, the lithium-air/oxygen or zinc-air/oxygen battery can include an electrochemical cell as disclosed herein.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1A:
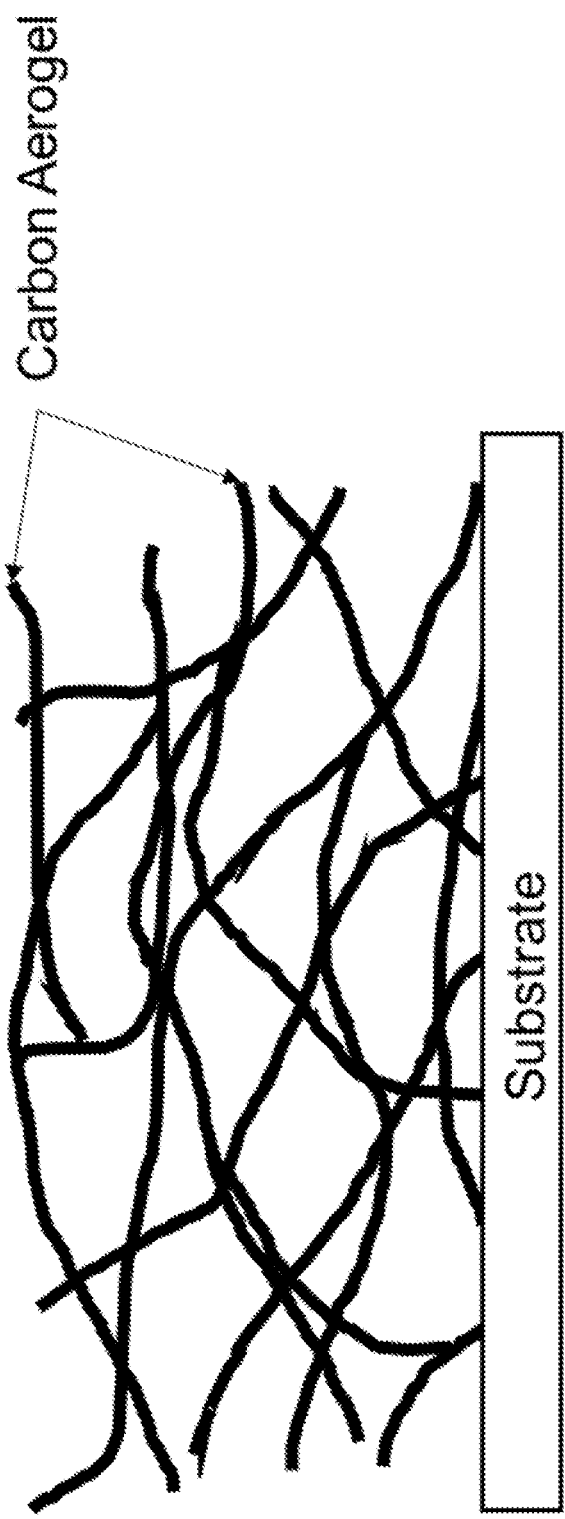
FIG. 1A is a schematic of a carbon aerogel optionally disposed on a substrate.

In the following detailed description of the invention, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to nitrogen porosimetry testing) attributable to aerogels: (a) an average pore diameter ranging from about 2 nm to about 100 nm; (b) a porosity of at least 80% or more, and (c) a surface area of about 20 $m^2/g$ or more. It can be understood that the inclusion of additives, such as a reinforcement material or an electrochemically active species, may decrease porosity of the resulting aerogel composite. This will become clearer as this specification continues.

Aerogel materials of the present disclosure thus include any aerogels or other open-celled compounds, which satisfy the defining elements set forth in previous paragraphs, including compounds, which can be otherwise categorized as xerogels, cryogels, ambigels, microporous materials, and the like.

Within the context of the present disclosure, the terms "framework" or "framework structure" refer to the network of interconnected oligomers, polymers, or colloidal particles that form the solid structure of a gel or an aerogel. The polymers or particles that make up the framework structures typically have a diameter of about 100 angstroms. However, framework structures of the present disclosure can also include networks of interconnected oligomers, polymers, or colloidal particles of all diameter sizes that form the solid structure within in a gel or aerogel.

Within the context of the present disclosure, the term "aerogel composition" refers to any composite material that includes aerogel material as a component of the composite. Examples of aerogel compositions include, but are not limited to, fiber-reinforced aerogel composites; aerogel composites including additive elements such as opacifiers and electrochemically active species; aerogel-foam composites; aerogel-polymer composites; and composite materials incorporating aerogel particulates, particles, granules, beads, or powders into a solid or semi-solid material, such as binders, resins, cements, foams, polymers, or similar solid materials.

Within the context of the present disclosure, the term "reinforced aerogel composition" refers to aerogel compositions comprising a reinforcing phase within the aerogel material, which either is not part of the aerogel framework or can be modified in a manner to covalently bond to the aerogel framework. The reinforcing phase can be any material that provides increased flexibility, resilience, conformability, or structural stability to the aerogel material. Examples of well-known reinforcing materials include, but are not limited to, open-cell foam reinforcement materials, closed-cell foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, reinforcements may be combined with one or more of the other reinforcing materials and can be oriented continuously throughout or in limited preferred parts of the composition. In other embodiments, no reinforcement phase may be used at all, if the aerogel material and/or aerogel framework is structurally stable on its own (i.e., self-sustaining). This self-sustaining nature of certain carbon aerogels will become clearer as this specification continues.

Within the context of the present disclosure, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by processing and extraction to replace the mobile interstitial liquid phase in the gel with air or another gas. Examples of wet gels include, but are not limited to, alcogels, hydrogels, ketogels, carbonogels, and any other wet gels known to those in the art.

Within the context of the present disclosure, the terms "additive" or "additive element" refer to materials that can be added to a composition before, during, or after the production of the composition. Additives can be added, for example, to alter or improve desirable properties in an aerogel composition, or to counteract or mitigate undesirable properties in an aerogel composition. Additives are typically added to an aerogel composition either prior to or during gelation. A particular example of an additive is a sacrificial porogen that can be decomposed in situ to provide a hierarchical pore structure.

Within the context of the present disclosure, the term "self-supporting" refers to the ability of an aerogel material or composition to be flexible and/or resilient based primarily on the physical properties of the aerogel. Self-supporting aerogel materials or compositions of the present disclosure can be differentiated from other aerogel materials, such as coatings, which rely on an underlying substrate or reinforcement material to provide flexibility and/or resilience to the material.

Within the context of the present disclosure, the term "density" refers to a measurement of the mass per unit volume of an aerogel material or composition. The term "density" generally refers to the true density of an aerogel material, as well as the bulk density of an aerogel composition. Density is typically recorded as $kg/m^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. Preferably, aerogel materials or compositions of the present disclosure have a density of about 1.50 g/cc or less, 1.40 g/cc or less, 1.30 g/cc or less, 1.20 g/cc or less, 1.10 g/cc or less, 1.00 g/cc or less, 0.90 g/cc or less, 0.80 g/cc or less, 0.70 g/cc or less, 0.60 g/cc or less, 0.50 g/cc or less, 0.40 g/cc or less, 0.30 g/cc or less, 0.20 g/cc or less, 0.10 g/cc or less, or in a range between any two of these values.

Production of an aerogel, according to certain embodiments, generally includes the following steps: i) formation of a solution containing a gel precursor; ii) formation of a gel from the solution; and iii) extracting the solvent from the gel materials to obtain a dried aerogel material. This process is discussed below in greater detail, specifically in the context of forming organic aerogels, such as polyimide aerogels. However, the specific examples and illustrations provided herein are not intended to limit the present disclosure to any specific type of aerogel and/or method of preparation. The present disclosure can include any aerogel formed by any associated method of preparation known to those in the art.

A solution is formed by combining at least one gelling precursor with a solvent. Suitable solvents for use in forming a solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the polymerization and gel formation steps thus depends on the specific precursors, fillers, and additives being incorporated into the solution; as well as the target processing conditions for gelling and liquid phase extraction, and the desired properties of the final aerogel materials.

A solution to produce a polyimide aerogel is formed by combining at least one diamine and at least one dianhydride in a common polar aprotic solvent(s). Additional details regarding polyimide gel/aerogel formation can be found in U.S. Pat. Nos. 7,074,880 and 7,071,287 to Rhine et al.; U.S. Pat. No. 6,399,669 to Suzuki et al.; U.S. Pat. No. 9,745,198 to Leventis et al.; Leventis et al., Polyimide Aerogels by Ring-Opening Metathesis Polymerization (ROMP), Chem. Mater. 2011, 23, 8, 2250-2261; Leventis et al., Isocyanate-Derived Organic Aerogels: Polyureas, Polyimides, Polyamides, MRS Proceedings, 1306 (2011), Mrsf10-1306-bb03-01. doi:10.1557/op1.2011.90; Chidambareswarapattar et al., One-step room-temperature synthesis of fibrous polyimide aerogels from anhydrides and isocyanates and conversion to isomorphic carbons, J. Mater. Chem., 2010, 20, 9666-9678; Guo et al., Polyimide Aerogels Cross-Linked through Amine Functionalized Polyoligomeric Silsesquioxane, ACS Appl. Mater. Interfaces 2011, 3, 546-552; Nguyen et al., Development of High Temperature, Flexible Polyimide Aerogels, American Chemical Society, proceedings published 2011; Meador et al., Mechanically Strong, Flexible Polyimide Aerogels Cross-Linked with Aromatic Triamine, ACS Appl. Mater. Interfaces, 2012, 4 (2), pp 536-544; Meador et al., Polyimide Aerogels with Amide Cross-Links: A Low Cost Alternative for Mechanically Strong Polymer Aerogels, ACS Appl. Mater. Interfaces 2015, 7, 1240-1249; Pei et al., Preparation and Characterization of Highly Cross-Linked Polyimide Aerogels Based on Polyimide Containing Trimethoxysilane Side Groups, Langmuir 2014, 30, 13375-13383, each of which is incorporated herein by reference in its entirety. Triamines, tetramines, pentamines, hexamines, etc. can also be used instead of or in addition to diamines or a combination thereof in order to optimize the properties of the gel material. Trianhydrides, tetranhydrides, pentanhydrides, hexanhydrides, can also be used instead of or in addition to dianhydrides or a combination thereof in order to optimize the properties of the gel material. A dehydrating agent and a catalyst are incorporated into the solution to initiate and drive imidization.

The solution can include additional co-gelling precursors, as well as filler materials and other additives. Filler materials and other additives may be dispensed in the solution at any point before or during the formation of a gel. Filler materials and other additives may also be incorporated into the gel material after gelation through various techniques known to those in the art. Preferably, the solution comprising the gelling precursors, solvents, catalysts, water, filler materials, and other additives is a homogenous solution, which is capable of effective gel formation under suitable conditions.

Once a solution has been formed and optimized, the gel-forming components in the solution can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques is known to those in the art. Examples include, but are not limited to: maintaining the mixture in a quiescent state for a sufficient period of time; adjusting the concentration of a catalyst; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 200° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with one or more aliphatic carbon atoms, dihydric alcohols with two or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using extraction methods, including processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber. In other embodiments, extraction can be performed using any suitable mechanism, for example altering the pressures, timings, and solvent discussed above.

In certain embodiments of the present disclosure, a dried carbon aerogel composition can be subjected to one or more heat treatments for a duration of time of 3 hours or more, between 10 seconds and 3 hours, between 10 seconds and 2 hours, between 10 seconds and 1 hour, between 10 seconds and 45 minutes, between 10 seconds and 30 minutes, between 10 seconds and 15 minutes, between 10 seconds and 5 minutes, between 10 seconds and 1 minute, between 1 minute and 3 hours, between 1 minute and 1 hour, between 1 minute and 45 minutes, between 1 minute and 30 minutes, between 1 minute and 15 minutes, between 1 minute and 5 minutes, between 10 minutes and 3 hours, between 10 minutes and 1 hour, between 10 minutes and 45 minutes, between 10 minutes and 30 minutes, between 10 minutes and 15 minutes, between 30 minutes and 3 hours, between 30 minutes and 1 hour, between 30 minutes and 45 minutes, between 45 minutes and 3 hours, between 45 minutes and 90 minutes, between 45 minutes and 60 minutes, between 1 hour and 3 hours, between 1 hour and 2 hours, between 1 hour and 90 minutes, or in a range between any two of these values.

In certain embodiments, the current invention involves the formation and use of nanoporous carbon-based scaffolds or structures, such as carbon aerogels, as host electrode materials within an energy storage device, for example as the primary cathode host for $Li_2O_2$ formation in a Li-air battery. The pores of the nanoporous scaffold are designed, organized, and structured to accommodate consistent nano-$Li_2O_2$ particle formation and dissolution. Alternatively, the pores of the nanoporous scaffold may be filled with catalyst or scavengers of species that can contribute to minimizing side reactions, such as, but not limited to, water and $CO_2$.

To further expand on the exemplary application within Li-air batteries, when carbon aerogel material is utilized as the conductive cathode host for the formation of $Li_2O_2$ as in certain embodiments of the current invention, the aerogel nanoporous structure has a narrow pore size distribution, and provides for high electrical conductivity, high mechanical strength, and a morphology and sufficient pore volume (at a final density) to accommodate a high percentage by weight of $Li_2O_2$. Structurally, certain embodiments of the current invention have a fibrillar morphology with a strut size that produces the aforementioned narrow pore size distribution and high pore volume, among other properties.

As will be further discussed, infra, the surface of the carbon aerogel may be modified via chemical, physical, or mechanical methods in order to enhance performance with the consistent nano-$Li_2O_2$ particle formation within the pores of the carbon aerogel. For example, additives—such as $MoS_2$ nanoflakes—may be added to the carbon aerogel to catalyze formation and dissolution of $Li_2O_2$. As another example, sacrificial agents can be used as additives to provide the carbon aerogel with bi-modal porosity. Ultimately, the interconnected porous carbon aerogel surface provides reactive sites for Li-oxygen reactions, and the carbon aerogel can be surface modified to favor formation and confinement of $Li_2O_2$ species. It is further contemplated that with or without surface modification, the carbon aerogel is structured and functions as a host that improves the oxygen transport properties of electrolyte solutions. Specifically, electrolyte diffuses through the pores of the carbon aerogel, and oxygen availability is subsequently determined by its diffusion in the electrolyte inside the carbon aerogel and its dissolution in the electrolyte (i.e., rather than forming $Li_2O_2$ species only at the interface between the electrolyte and oxygen). As such, improved oxygen transport properties of electrolyte solutions increases availability of oxygen to react with lithium to form $Li_2O_2$, thus benefiting the functioning of the electrode and Li-air battery as a whole.

In additional or alternative embodiments, it is contemplated that existing current collector materials can be made porous, such as that of a mesh, and be integrated with the cathode materials (carbon aerogels) to augment the aluminum foil's current collection capabilities or capacities. It is noted that in conventional LIBs, aluminum foil is coupled to the cathode as its current collector. Without presence of a distinct porous current collector, due to the cathode of the Li-air battery typically being physically accessible to the external air, the carbon aerogel itself also functions as a current collector due to the necessary construction of Li-air batteries with its high electrical conductivity and mechanical strength.

In certain embodiments, nanoporous carbon-based scaffolds or structures, and specifically the carbon aerogel can be used as the conductive network or current collector on the cathode side of an energy storage device. The fully interconnected carbon aerogel network is filled with electrochemically active species, such as the formation of $Li_2O_2$ during discharge, where the electrochemically active species are in direct contact or physically connected to the carbon network. Capacity loading of electrochemically active species is tuned with respect to pore volume and porosity for high and stable capacity and improved energy storage device safety. In yet another embodiment, the cathode may comprise nanoporous carbon-based scaffolds or structures, and specifically carbon aerogels.

Within the context of the present disclosure, the term "collector-less" refers to the absence of a distinct current collector that is directly connected to an electrode. As noted, in conventional LIB, an aluminum foil is typically coupled to the cathode as its current collector. Electrodes formed from nanoporous carbon-based scaffolds or structures (e.g., carbon aerogels), according to embodiments of the current invention, can be a freestanding structure or otherwise have the capability of being collector-less since the scaffold or structure itself functions as the current collector, due to its high electrical conductivity. Within the electrochemical cell, a collector-less electrode can be connected to form a circuit by embedding solid, mesh, woven tabs during the solution step of making the continuous porous carbon; or by soldering, welding, or metal depositing leads onto a portion of the porous carbon surface. Other mechanisms of contacting the carbon to the remainder of the system are contemplated herein as well. In alternative embodiments, the nanoporous carbon-based scaffolds or structures, and specifically a carbon aerogel may be disposed on or otherwise in communication with a dedicated current-collecting substrate (e.g., copper foil, aluminum foil, etc.). In this scenario, the carbon aerogel can be attached to a solid or porous or mesh current collector using a conductive adhesive and applied with varying amounts of pressure.

Furthermore, it is contemplated herein that the nanoporous carbon-based scaffolds or structures, and specifically carbon aerogels, can take the form of monolithic structures or in a powder form. When monolithic in nature, the carbon aerogel eliminates the need for any binders; in other words, the cathode can be binder-less. As used herein, the term "monolithic" refers to aerogel materials in which a majority (by weight) of the aerogel included in the aerogel material or composition is in the form of a unitary, continuous, interconnected aerogel nanostructure. Monolithic aerogel materials include aerogel materials which are initially formed to have a unitary interconnected gel or aerogel nanostructure, but which can be subsequently cracked, fractured, or segmented into non-unitary aerogel nanostructures. Monolithic aerogels may take the form of a freestanding structure or a reinforced (fiber or foam) material. In comparison, using Li-air batteries as an example, uniform $Li_2O_2$ nanoparticles form within a monolithic aerogel where they can be utilized more effectively during formation and dissolution.

Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined together (i.e., via a binder, such as a polymer binder) or compressed together but which lack an interconnected aerogel nanostructure between individual particles. Collectively, aerogel materials of this form will be referred to as having a powder form (as opposed to a monolithic form). It should be noted that despite an individual particle of a powder having a unitary structure, the individual particle is not considered herein as a monolith. Integration of aerogel powder into an electrochemical cell typically requires calendaring from a paste/slurry, resulting in dilution of active surface area.

Within the context of the present disclosure, the terms "binder-less" or "binder-free" (or derivatives thereof) refer to a material being substantially free of binders or adhesives to hold that material together. For example, a monolithic nanoporous carbon material is free of binder since its framework is formed as a unitary, continuous interconnected structure. Advantages of being binder-less include avoiding any negative effects of binders, such as on electrical conductivity and pore volume. On the other hand, aerogel powder requires a binder to hold together to form a larger, functional material; such larger material is not contemplated herein to be a monolith. In addition, this "binder-free" terminology does not exclude all uses of binders. For example, a monolithic aerogel, according to the current invention, may be secured to another monolithic aerogel or a non-aerogel material by disposing a binder or adhesive onto a major surface of the aerogel material. In this way, the binder is used to create a laminate composite, but the binder has no function to maintain the stability of the monolithic aerogel framework itself.

Furthermore, monolithic polymeric aerogel materials or compositions of the present disclosure may be compressed up to 95% strain without significant breaking or fracturing of the aerogel framework, while densifying the aerogel and minimally reducing porosity. In certain embodiments, the compressed polymeric aerogel materials or compositions are subsequently carbonized using varying methods described herein, to form nanoporous carbon materials. It can be understood that amount of compression affects thickness of the resulting carbon material, where the thickness has an effect on capacity, as will become clearer as this specification continues. The examples, described infra, will illustrate varying thicknesses that are formed and contemplated by the current invention, where thickness is adjustable based on compression. As such, thickness of a composite (typically compressed) can be about 10-1000 μm, or any narrower range therein based on benefits needed of the final composite. The current invention also contemplates a powder or particle form of the carbon aerogel, where a binder would be needed and particle size optimized. A range of particle sizes may be about 5-50 μm.

Nanoporous carbons, such as carbon aerogels, according to the current invention, can be formed from any suitable organic precursor materials. Examples of such materials include, but are not limited to, RF, PF, PI, polyamides, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations and derivatives thereof. Any precursors of these materials may be used to create and use the resulting materials. In an exemplary embodiment, the carbon aerogel is formed from a pyrolyzed/carbonized polyimide-based aerogel, i.e., the polymerization of polyimide. Even more specifically, the polyimide-based aerogel can be produced using one or more methodologies described in U.S. Pat. Nos. 7,071,287 and 7,074,880 to Rhine et al., e.g., by imidization of poly(amic) acid and drying the resulting gel using a supercritical fluid. Other adequate methods of producing polyimide aerogels (and carbon aerogels derived therefrom) are contemplated herein as well, for example as described in U.S. Pat. No. 6,399,669 to Suzuki et al.; U.S. Pat. No. 9,745,198 to Leventis et al.; Leventis et al., Polyimide Aerogels by Ring-Opening Metathesis Polymerization (ROMP), Chem. Mater. 2011, 23, 8, 2250-2261; Leventis et al., Isocyanate-Derived Organic Aerogels: Polyureas, Polyimides, Polyamides, MRS Proceedings, 1306 (2011), Mrsf10-1306-bb03-01. doi:10.1557/op1.2011.90; Chidambareswarapattar et al., One-step room-temperature synthesis of fibrous polyimide aerogels from anhydrides and isocyanates and conversion to isomorphic carbons, J. Mater. Chem., 2010, 20, 9666-9678; Guo et al., Polyimide Aerogels Cross-Linked through Amine Functionalized Polyoligomeric Silsesquioxane, ACS Appl. Mater. Interfaces 2011, 3, 546-552; Nguyen et al., Development of High Temperature, Flexible Polyimide Aerogels, American Chemical Society, proceedings published 2011; Meador et al., Mechanically Strong, Flexible Polyimide Aerogels Cross-Linked with Aromatic Triamine, ACS Appl. Mater. Interfaces, 2012, 4 (2), pp 536-544; Meador et al., Polyimide Aerogels with Amide Cross-Links: A Low Cost Alternative for Mechanically Strong Polymer Aerogels, ACS Appl. Mater. Interfaces 2015, 7, 1240-1249; Pei et al., Preparation and Characterization of Highly Cross-Linked Polyimide Aerogels Based on Polyimide Containing Trimethoxysilane Side Groups, Langmuir 2014, 30, 13375-13383. The resulting polyimide aerogel would then be pyrolyzed to form a polyimide-derived carbon aerogel.

In certain embodiments of the present disclosure, a dried polymeric aerogel composition can be subjected to a treatment temperature of 200° C. or above, 400° C. or above, 600° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the organic (e.g., polyimide) aerogel. Without being bound by theory, it is contemplated herein that the electrical conductivity of the aerogel composition increases with carbonization temperature.

Within the context of the present disclosure, the term "electrical conductivity" refers to a measurement of the ability of a material to conduct an electric current or otherwise allow the flow of electrons therethrough or therein. Electrical conductivity is specifically measured as the electric conductance/susceptance/admittance of a material per unit size of the material. It is typically recorded as S/m (Siemens/meter) or S/cm (Siemens/centimeter). The electrical conductivity or resistivity of a material may be determined by methods known in the art, for example including, but not limited to: In-line Four Point Resistivity (using the Dual Configuration test method of ASTM F84-99). Within the context of the present disclosure, measurements of electrical conductivity are acquired according to ASTM F84—resistivity (R) measurements obtained by measuring voltage (V) divided by current (I), unless otherwise stated. In certain embodiments, aerogel materials or compositions of the present disclosure have an electrical conductivity of about 1 S/cm or more, about 5 S/cm or more, about 10 S/cm or more, 20 S/cm or more, 30 S/cm or more, 40 S/cm or more, 50 S/cm or more, 60 S/cm or more, 70 S/cm or more, 80 S/cm or more, or in a range between any two of these values. It is noted that a highly electrically conductive carbon allows reactions to take place at surfaces of the carbon, thus facilitating the formation of $Li_2O_2$ at such carbon surfaces.

Within the context of the present disclosure, the term "electrochemically active species" refers to a material that is capable of accepting and releasing ions within an energy storage device. Using Li-air batteries as an example, an electrochemically active species within the cathode accepts lithium ions during discharge (thus undergoing conversion to $Li_2O_2$ species) and releases lithium ions during charge. The electrochemically active species can be stabilized within the cathode by having a direct/physical connection with the pore walls of a nanoporous carbon. In certain embodiments, $Li_2O_2$ nanoparticles of uniform particle size form on the surface and/or within the pores of the nanoporous carbon network. The electrochemically active species is connected to the nanoporous carbon at a plurality of points. The amount of $Li_2O_2$ that can form, i.e., the capacity of the cathode, is determined by the surface area, pore volume, and pore size of the nanoporous carbon material. In certain embodiments, aerogel materials or compositions of the present disclosure have the capacity to form $Li_2O_2$ between about 5% by weight of the cathode and about 90% by weight of the cathode, or any range between these two values.

Within the context of the present disclosure, the terms "compressive strength", "flexural strength", and "tensile strength" refer to the resistance of a material to breaking or fracture under compression forces, flexure or bending forces, and tension or pulling forces, respectively. These strengths are specifically measured as the amount of load/force per unit area resisting the load/force. It is typically recorded as pounds per square inch (psi), megapascals (MPa), or gigapascals (GPa). Among other factors, the compressive strength, flexural strength, and tensile strength of a material collectively contribute to the material's structural integrity, which is beneficial in a Li-air battery. Referring specifically to Young's modulus, which is an indication of mechanical strength, the modulus may be determined by methods known in the art, for example including, but not limited to: Standard Test Practice for Instrumented Indentation Testing (ASTM E2546, ASTM International, West Conshocken, Pa.); or Standardized Nanoindentation (ISO 14577, International Organization for Standardization, Switzerland). Within the context of the present disclosure, measurements of Young's modulus are acquired according to ASTM E2546 and ISO 14577, unless otherwise stated. In certain embodiments, aerogel materials or compositions of the present disclosure have a Young's modulus of about 0.2 GPa or more, 0.4 GPa or more, 0.6 GPa or more, 1 GPa or more, 2 GPa or more, 4 GPa or more, 6 GPa or more, 8 GPa or more, or in a range between any two of these values.

Within the context of the present disclosure, the term "pore size distribution" refers to the statistical distribution or relative amount of each pore size within a sample volume of a porous material. A narrower pore size distribution refers to a relatively large proportion of pores at a narrow range of pore sizes, thus optimizing the amount of pores that can surround the electrochemically active species and maximizing use of the pore volume. Conversely, a broader pore size distribution refers to relatively small proportion of pores at a narrow range of pore sizes. As such, pore size distribution is typically measured as a function of pore volume and recorded as a unit size of a full width at half max of a predominant peak in a pore size distribution chart. The pore size distribution of a porous material may be determined by methods known in the art, for example including, but not limited to, surface area and porosity analyzer by nitrogen adsorption and desorption from which pore size distribution can be calculated. Within the context of the present disclosure, measurements of pore size distribution are acquired according to this method, unless otherwise stated. In certain embodiments, aerogel materials or compositions of the present disclosure have a relatively narrow pore size distribution (full width at half max) of about 50 nm or less, 45 nm or less, 40 nm or less, 35 nm or less, 30 nm or less, 25 nm or less, 20 nm or less, 15 nm or less, 10 nm or less, 5 nm or less, or in a range between any two of these values.

Within the context of the present disclosure, the term "pore volume" refers to the total volume of pores within a sample of porous material. Pore volume is specifically measured as the volume of void space within the porous material, where that void space may be measurable and/or may be accessible by another material, for example the formation of $Li_2O_2$ at the carbon surface with available oxygen. It is typically recorded as cubic centimeters per gram ($cm^3/g$ or cc/g). The pore volume of a porous material may be determined by methods known in the art, for example including, but not limited to, surface area and porosity analyzer by nitrogen adsorption and desorption from which pore volume can be calculated. Within the context of the present disclosure, measurements of pore volume are acquired according to this method, unless otherwise stated. In certain embodiments, aerogel materials or compositions of the present disclosure (prior to formation of $Li_2O_2$) have a relatively large pore volume of about 1 cc/g or more, 1.5 cc/g or more, 2 cc/g or more, 2.5 cc/g or more, 3 cc/g or more, 3.5 cc/g or more, 4 cc/g or more, or in a range between any two of these values. In other embodiments, aerogel materials or compositions of the present disclosure (after formation of $Li_2O_2$) have a pore volume of about 0.3 cc/g or more, 0.6 cc/g or more, 0.9 cc/g or more, 1.2 cc/g or more, 1.5 cc/g or more, 1.8 cc/g or more, 2.1 cc/g or more, 2.4 cc/g or more, 2.7 cc/g or more, 3.0 cc/g or more, 3.3 cc/g or more, 3.6 cc/g or more, or in a range between any two of these values.

Within the context of the present disclosure, the term "porosity" refers to a volumetric ratio of pores that does not contain another material (e.g., $Li_2O_2$) bonded to the walls of the pores. For clarification and illustration purposes, it should be noted that within the specific implementation of carbon aerogel as the host for $Li_2O_2$ formation in a Li-air battery, porosity refers to the void space after formation of $Li_2O_2$. Porosity may be determined by methods known in the art, for example including, but not limited to, the ratio of the pore volume of the aerogel material to its bulk density. Within the context of the present disclosure, measurements of porosity are acquired according to this method, unless otherwise stated. In certain embodiments, aerogel materials or compositions of the present disclosure have a porosity of about 80% or less, 70% or less, 60% or less, 50% or less, 40% or less, 30% or less, 20% or less, 10% or less, or in a range between any two of these values.

It should be noted that pore volume and porosity are different measures for the same property of the pore structure, namely the "empty space" within the pore structure. For example, when $Li_2O_2$ is formed within the pores of the nanoporous carbon material, pore volume and porosity refer to the space that is "empty", namely the space not utilized by the carbon or $Li_2O_2$. As will be seen, compression of the pre-carbonized nanoporous material would also have an effect on pore volume and porosity, among other properties.

Within the context of the present disclosure, the term "pore size at max peak from distribution" refers to the value at the discernible peak on a graph illustrating pore size distribution. Pore size at max peak from distribution is specifically measured as the pore size at which the greatest percentage of pores is formed. It is typically recorded as any unit length of pore size, for example μm or nm. The pore size at max peak from distribution may be determined by methods known in the art, for example including, but not limited to, surface area and porosity analyzer by nitrogen adsorption and desorption from which pore size distribution can be calculated and pore size at max peak can be determined. Within the context of the present disclosure, measurements of pore size at max peak from distribution are acquired according to this method, unless otherwise stated. In certain embodiments, aerogel materials or compositions of the present disclosure have a pore size at max peak from distribution of about 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, 10 nm or less, 5 nm or less, 2 nm or less, or in a range between any two of these values.

Within the context of the present disclosure, the term "strut width" refers to the average diameter of nanostruts, nanorods, nanofibers, or nanofilaments that form an aerogel having a fibrillar morphology. It is typically recorded as any unit length, for example μm or nm. The strut width may be determined by methods known in the art, for example including, but not limited to, scanning electron microscopy image analysis. Within the context of the present disclosure, measurements of strut width are acquired according to this method, unless otherwise stated. In certain embodiments, aerogel materials or compositions of the present disclosure have a strut width of about 10 nm or less, 9 nm or less, 8 nm or less, 7 nm or less, 6 nm or less, 5 nm or less, 4 nm or less, 3 nm or less, 2 nm or less, or in a range between any two of these values. Smaller strut widths, such as those in the range of about 2-5 nm, permit a greater amount of struts to be present within the network and thus contact the electrochemically active species, in turn allowing more of the electrochemically active species to be present within the composite. This increases electrical conductivity and mechanical strength.

Within the context of the present disclosure, the term "fibrillar morphology" refers to the structural morphology of a nanoporous carbon (e.g., aerogel) being inclusive of struts, rods, fibers, or filaments. For example, in an embodiment, choice of solvent, such as dimethylacetamide (DMAC), can affect the production of such morphology. Further, in certain embodiments, when the carbon aerogel is derived from polyimides, a crystalline polyimide results from the polyimide forming a linear polymer. As will become clearer in the following examples, certain embodiments were observed surprisingly to include a fibrillar morphology as an interconnected polymeric structure, where a long linear structure was anticipated, based on the known behavior of the polyimide precursors. In comparison, the product form of the nanoporous carbon can alternatively be particulate in nature or powder wherein the fibrillar morphology of the carbon aerogel persists. As will become clearer as this specification continues, a fibrillar morphology can provide certain benefits over a particulate morphology, such as mechanical stability/strength and electrical conductivity, particularly when the nanoporous carbon is implemented in specific applications, for example as the cathodic material in a Li-air battery. It should be noted that this fibrillar morphology can be found in nanoporous carbons of both a monolithic form and a powder form; in other words, a monolithic carbon can have a fibrillar morphology, and aerogel powder/particles can have a fibrillar morphology. Furthermore, in certain embodiments, when the nanoporous carbon material contains additives or forms compounds such as $Li_2O_2$, the fibrillar nanostructure inherent to the carbon material is preserved and serves as a bridge between additive particles.

Within the context of the present disclosure, the term "cycle life" refers to the number of complete charge/discharge cycles that a cathode or a battery (e.g., Li-air battery) is able to support before its capacity falls under about 80% of its original rated capacity. Cycle life may be affected by a variety of factors that are not significantly impacted over time, for example mechanical strength of the underlying substrate (e.g., carbon aerogel), formation/connectivity and dissolution of $Li_2O_2$ within and from the aerogel, and maintenance of interconnectivity of the aerogel. It is noted that these factors actually remaining relatively unchanged over time is a surprising aspect of certain embodiments of the current invention. Cycle life may be determined by methods known in the art, for example including, but not limited to, cycle testing, where battery cells are subject to repeated charge/discharge cycles at predetermined current rates and operating voltage. Within the context of the present disclosure, measurements of cycle life are acquired according to this method, unless otherwise stated. In certain embodiments of the present disclosure, energy storage devices, such as batteries, or electrode thereof, have a cycle life of about 25 cycles or more, 50 cycles or more, 75 cycles or more, 100 cycles or more, 200 cycles or more, 300 cycles or more, 500 cycles or more, 1000 cycles or more, or in a range between any two of these values.

Within the context of the present disclosure, the term "capacity" refers to the amount of specific energy or charge that a battery is able to store. Capacity is specifically measured as the discharge current that the battery can deliver over time, per unit mass. It is typically recorded as ampere-hours or milliampere-hours per gram of total electrode mass, Ah/g or mAh/g. The capacity of a battery (and a cathode in particular) may be determined by methods known in the art, for example including, but not limited to: applying a fixed constant current load to a fully charged cell until the cell's voltage reaches the end of discharge voltage value; the time to reach end of discharge voltage multiplied by the constant current is the discharge capacity; by dividing the discharge capacity by the weight of electrode material or volume, specific and volumetric capacities can be determined. Within the context of the present disclosure, measurements of capacity are acquired according to this method, unless otherwise stated. In certain embodiments, aerogel materials or compositions of the present disclosure have a capacity of about 500 mAh/g or more, 1000 mAh/g or more, 1500 mAh/g or more, 2000 mAh/g or more, 3000 mAh/g or more, 4000 mAh/g or more, 5000 mAh/g or more, 6000 mAh/g or more, 7000 mAh/g or more, 8000 mAh/g or more, 9000 mAh/g or more, 10,000 mAh/g or more, or in a range between any two of these values.

In certain embodiments, the current invention is a PI-derived nanoporous carbon material (e.g., carbon aerogel) having an array of pores that surround, contain, or encapsulate $Li_2O_2$ therewithin. The nanoporous carbon material functions as the ideal host for $Li_2O_2$ due to its optimal pore structure, functional pore morphology, and high mechanical integrity. The nanoporous carbon material (carbon aerogel) is characterized by narrow pore size distribution, resulting in consistent behavior of the oxygen and $Li_2O_2$ species throughout the interconnected network. The carbon material itself is further characterized by high electrical conductivity, which serves to overcome a major drawback of conventional Li-air batteries, namely the resistivity of the $Li_2O_2$ species. The above characteristics of the current nanoporous carbon materials, individually and in combination, impart certain benefits to increases cycle life and cell lifetime of the resulting Li-air system or cathode thereof.

Figure 1B:
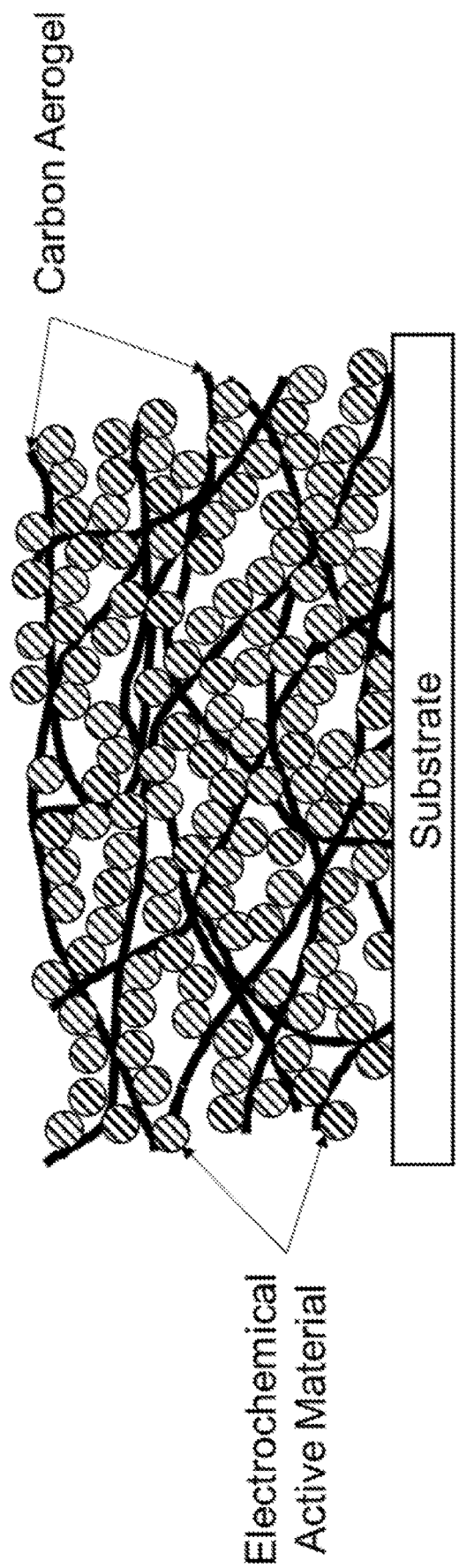
FIG. 1B is a schematic of a carbon aerogel optionally disposed on a substrate, where lithium peroxide nanoparticles are formed within and connected to the aerogel network.

In an embodiment, the current invention is a cathode of a Li-air battery, comprising a polyimide-derived carbon aerogel, where elemental oxygen enters the aerogel from the external environment or other oxygen source. Oxygen reacts with lithium from the anode and forms $Li_2O_2$ along the surface and/or within the pores of the carbon aerogel (see FIGS. 1A-1B). As will be seen, the structure of the carbon aerogel pores is tunable to have different properties (e.g., pore volume, pore size, pore size distribution, and surface area) based on need (e.g., size or capacity of electrode in a Li-air battery). In another embodiment, the current invention is an electrode in a Li-air battery or electrochemical cell thereof comprising such a cathode. In Li-air batteries, cathodes—such as those described herein as nanoporous carbon materials or carbon aerogels—are most commonly paired with lithium anodes in order to achieve a balanced capacity and lithium ions for reaction with oxygen. In yet further embodiments, the current invention is a device or system that incorporates such an energy storage device.

In certain embodiments, the current invention is a method of forming or manufacturing a continuous, porous carbon composite, such as a carbon aerogel. Polyimide precursors, such as diamine and dianhydride that can each include an aromatic group and/or an aliphatic group, are mixed in a suitable solvent (e.g., polar, aprotic solvent). The imidization gelation catalyst is then added to initiate the mixture for gelation. In alternative embodiments, imidization can be accomplished via thermal imidization, where any suitable temperature and time range is contemplated (e.g., about 100° C.-200° C. for about 20 minutes to about 8 hours, followed by heating at about 300° C.-400° C. for about 20 minutes to about 1 hour). The gelled mixture is then dried to yield a continuous porous polyimide composite, where the drying can be performed using subcritical and/or supercritical carbon dioxide. Optionally, the polyimide composite can be compressed to increase density, adjustable up to about 1.5 g/cc based on the amount of compression. Regardless of whether compression has taken place, the polyimide composite is pyrolyzed to yield a continuous porous carbon, where the carbon comprises a porosity between about 5%-99%. In certain embodiments, pyrolysis can be performed at a maximum temperature of between about 750° C. and about 1600° C., optionally with graphitization from about 1600° C. up to about 3000° C. Following carbonization and implementation within a Li-air battery, oxygen is incorporated into the network of the porous carbon from the external environment or other oxygen source, and reacts with lithium to form $Li_2O_2$.

In certain embodiments, the carbon composite can be a monolith or a freestanding structure, can be prepared on or off a substrate, or can be micronized to a powder form. Furthermore, the composite may be reinforced with or without a non-woven or woven material (e.g., fiber, foam, etc.).

Optionally, due to water being a problematic species for Li-air batteries because of its adverse reaction with lithium metal in the anode and/or with $Li_2O_2$ in the cathode, as previously discussed, the carbon aerogel may be laminated with a hydrophobic silica aerogel, where the silica aerogel is typically positioned between the carbon aerogel and the external environment or other oxygen source. Any suitable hydrophobic aerogel may be utilized in this scenario. In addition, any suitable mechanism for securing the hydrophobic aerogel to the carbon aerogel is contemplated, for example including, but not limited to, organic and inorganic adhesives, non-adhesive binding such as needle punching, etc.

Furthermore, it is contemplated herein that the pore size is tunable as needed. There are five primary methods of adjusting pore size taught herein. First, the amount of solids content, specifically the amount of polyimide precursor monomers (e.g., aromatic or aliphatic diamine and aromatic or aliphatic dianhydride), can adjust pore size. Smaller pore sizes result from a greater amount of solids per unit volume of fluid, due to less room being available such that interconnection takes place more closely. It should be noted that strut width does not change measurably, regardless of the amount of solids used. The amount of solids relates more so to how dense the network will be.

Another method of adjusting pore size is the use of radiation (e.g., radio wave, microwave, infrared, visible light, ultraviolet, X-ray, gamma ray) on the composite in either polyimide state or in carbon state. Radiation has an oxidizing effect, resulting in an increase in surface area, increase in pore size, and broadening of pore size distribution. Thirdly, pore size is affected by a macroscopic compression of the polyimide composite. As will be evidenced in the examples below, pore size reduces with compression.

Yet another method of adjusting pore size is ion bombardment of the composite in either polyimide state or carbon state. The effect of ion bombardment depends on the method designated. For example, there is additive ion bombardment (e.g., CVD), where something is added, resulting in a reduction of pore size. There is also destructive ion bombardment, where pore size would increase. Finally, pore size can be adjusted (increase or decrease) with heat treatment under different gas environments, for example presence of carbon dioxide or carbon monoxide, chemically active environments, hydrogen reducing environments, etc. A carbon dioxide environment, for example, is known to make activated carbon, where in instances of activation, mass is removed, pore size increases, and surface area increases.

Alternative Methods of Producing a PI Aerogel

Previous examples discussed herein teach certain methodologies of forming a PI aerogel. In certain embodiments, the current invention contemplates alternative methods of forming a PI aerogel as well. A non-exhaustive and non-limiting set of examples of such alternative methodologies will now be discussed.

For example, U.S. Pat. No. 6,399,669 to Suzuki et al. teaches four (4) related methods of making a PI dry gel (aerogel). In a first method, a PI precursor is synthesized, followed by formation of an imide from PI precursor, resulting in production of polyimide. A PI solution or swollen bulk is prepared, and the solution/swollen bulk is gelled to produce a PI wet gel. This wet gel is dried, resulting in the PI dry gel (aerogel). In a second method, a PI precursor is synthesized, followed by preparation of a PI precursor solution or swollen bulk. The solution/swollen bulk is gelled to produce a PI precursor wet gel. An imide is then formed from the PI precursor to form a PI wet gel. This wet gel is dried, resulting in the PI dry gel (aerogel). In a third method, a PI precursor is synthesized, followed by preparation of a PI precursor solution or swollen bulk. An imide is then formed from the PI precursor while gelling it to produce a PI wet gel. In a third method, a PI precursor is synthesized, followed by preparation of a PI precursor solution or swollen bulk. The solution/swollen bulk is gelled to produce a PI precursor wet gel. This wet gel is then dried to produce a PI precursor dry gel. An imide is then formed from the PI precursor dry gel to form a PI dry gel (aerogel).

As further examples, Leventis et al. [Polyimide Aerogels by Ring-Opening Metathesis Polymerization (ROMP), Chem. Mater. 2011, 23, 8, 2250-2261] discusses the formation of PI aerogels using the ROMP method. Low-molecular weight imidized oligomers that are end-capped with polymerizable groups are provided and mixed with a polymerization (e.g., ROMP) catalyst. Polymerization is thus initiated, creating a cross-linked polyimide. This polyimide is gelled and dried to form a PI aerogel. Leventis et al. [U.S. Pat. No. 9,745,198; Chidambareswarapattar et al., One-step room-temperature synthesis of fibrous polyimide aerogels from anhydrides and isocyanates and conversion to isomorphic carbons, J. Mater. Chem., 2010, 20, 9666-9678] also teaches formation of a PI aerogel by mixing a dianhydride (e.g., PMDA) with an isocyanate (e.g., 4,4'-diisocyanatodiphenyl-methane or methylene di-p-phenyldiisocyanate) to form a sol-gel material. That sol-gel material is then dried to produce the PI aerogel. Leventis et al. [Isocyanate-Derived Organic Aerogels: Polyureas, Polyimides, Polyamides, MRS Proceedings, 1306 (2011), Mrsf10-1306-bb03-01. doi: 10.1557/opl.2011.90] also notes that DESMODUR N 3300A, DESMODUR RE, and MONDUR CD (all obtained from BAYER CORP.) may be utilized as the isocyanate.

In alternative methodologies, Guo et al. [Polyimide Aerogels Cross-Linked through Amine Functionalized Polyoligomeric Silsesquioxane, ACS Appl. Mater. Interfaces 2011, 3, 546-552] discusses the formation of PI aerogels by reacting amino silsesquioxane with polyamic acid oligomers that are end-capped with anhydride groups. The product is imidized using pyridine (though thermal imidization is also contemplated) and gelled, followed by drying to obtain the PI aerogel. Nguyen et al. [Development of High Temperature, Flexible Polyimide Aerogels, American Chemical Society, proceedings published 2011] discuss the creation of a branched polyimide by mixing diamine and dianhydride, and imidizing, followed by a reaction with a multi-amino compound (e.g., 1,3,5-tris(4-aminophenoxybenzene)). This product is then reacted with 4,4'-methylenediisocyanate, and dried to form a PI-urea aerogel.

In other embodiments, Meador et al. [Mechanically Strong, Flexible Polyimide Aerogels Cross-Linked with Aromatic Triamine, ACS Appl. Mater. Interfaces, 2012, 4 (2), pp 536-544] discusses the production of PI gels by cross-linking polyamic acid oligomers that are end-capped with anhydride groups, with aromatic triamine in solution, followed by imidization. The resulting wet is dried to form a PI aerogel. Furthermore, Meador et al. [Polyimide Aerogels with Amide Cross-Links: A Low Cost Alternative for Mechanically Strong Polymer Aerogels, ACS Appl. Mater. Interfaces 2015, 7, 1240-1249] discusses the formation of PI gels by cross-linking amine-capped oligomers with 1,3,5-benzenetricarbonyl trichloride. The resulting gel was dried to form the PI aerogel.

In yet another embodiment, Pei et al. [Preparation and Characterization of Highly Cross-Linked Polyimide Aerogels Based on Polyimide Containing Trimethoxysilane Side Groups, Langmuir 2014, 30, 13375-13383] produces a PI aerogel from polyimide containing trimethoxysilane side groups, which was a condensation product of polyimide containing acid chloride side groups and 3-aminopropyltrimethoxysilane. The resulting gel was dried to form the PI aerogel.

In any one of these methods, suspension of graphene can be added (see Zhang et al., Graphene/carbon aerogels derived from graphene crosslinked polyimide as electrode materials for supercapacitors, RSC Adv., 2015, 5, 1301).

Each of these methodologies can lead to a polyimide aerogel, and the current invention contemplates any suitable method for producing such polyimide aerogel. According to certain embodiments of the current invention, regardless of which methodology is utilized to produce the PI aerogel, the resulting PI aerogel can be pyrolyzed to form a PI-derived carbon aerogel.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference should be disregarded.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A nanoporous carbon cathode comprising:
    a carbonized aerogel material having:
       a pore structure comprising a fibrillar morphology with a substantially uniform pore size distribution, where pores accommodate formation of lithium peroxide particles;
       a Young's modulus of at least about 0.2 GPa; and
       a density between about 0.10 g/cc and about 1.5 g/cc.

2. The nanoporous carbon cathode of claim 1, wherein the carbonized nanoporous carbon material has an electrical conductivity of at least about 1 S/cm.

3. The nanoporous carbon cathode of claim 1, wherein the carbonized nanoporous carbon material comprises a polyimide-derived carbon aerogel.

4. The nanoporous carbon cathode of claim 3, wherein the polyimide-derived carbon aerogel is in a monolith form.

5. The nanoporous carbon cathode of claim 4, wherein the carbon aerogel is substantially or completely binder-free.

6. The nanoporous carbon cathode of claim 4, wherein the carbon aerogel has a thickness between about 10 μm and about 1000 μm.

7. The nanoporous carbon cathode of claim 1, wherein the pore structure is characterized by pores surrounding the lithium peroxide particles.

8. The nanoporous carbon cathode of claim 7, wherein the pores form interconnected structures around the lithium peroxide particles, characterized by a plurality of connection points between the lithium peroxide particles and pore walls of each pore in which the lithium peroxide particles are surrounded.

9. The nanoporous carbon cathode of claim 1, wherein the nanoporous carbon cathode accommodates about 5%-90% of the lithium peroxide particles by weight of the carbonized nanoporous carbon material.

10. The nanoporous carbon cathode of claim 1, wherein the carbonized nanoporous carbon material has a pore volume of at least 0.3 cc/g.

11. The nanoporous carbon cathode of claim 1, wherein the carbonized nanoporous carbon material has a porosity between about 10% and about 90%.

12. The nanoporous carbon cathode of claim 1, wherein the carbonized nanoporous carbon material has a capacity of at least about 800 mAh/g.

13. The nanoporous carbon cathode of claim 1, wherein the pore structure comprises a full width at half max of about 50 nm or less.

14. The nanoporous carbon cathode of claim 1, wherein the pore structure comprises a pore size at max peak from distribution of about 100 nm or less.

15. The nanoporous carbon cathode of claim 1, wherein the fibrillar morphology comprises a plurality of struts, wherein the struts further comprise carbonized material and wherein at least some of the struts have an average strut width of about 2-10 nm.

16. An electrochemical cell comprising the carbonized nanoporous carbon cathode of claim 1.

17. A lithium-air/oxygen or zinc-air/oxygen battery, comprising the electrochemical cell of claim 16.

* * * * *